United States Patent
Glazier et al.

[11] Patent Number: 5,950,463
[45] Date of Patent: Sep. 14, 1999

[54] VEHICLE BRAKE LOCKING APPARATUS

[76] Inventors: James Glazier, 20, 4308-42 Ave., Rocky Mountain House, Alberta, Canada, T0M 1T1; Ken Toole, 4703-64 St., Rocky Mountain House, Alberta, Canada, TOM 1T2

[21] Appl. No.: 08/798,849

[22] Filed: Feb. 12, 1997

[51] Int. Cl.[6] .................................................. F16H 57/00
[52] U.S. Cl. .............................. 70/202; 70/237; 74/481; 403/319
[58] Field of Search ............................. 70/198–203, 237, 70/238, 254; 411/554; 403/319, 353; 180/287; 74/481

[56] References Cited

U.S. PATENT DOCUMENTS

| | | | |
|---|---|---|---|
| 1,318,443 | 10/1919 | Gimperling | 70/203 X |
| 1,368,117 | 2/1921 | Claude | 411/554 X |
| 1,389,966 | 9/1921 | Morris | 70/202 |
| 1,569,721 | 1/1926 | Dalferes | 70/202 |
| 2,812,669 | 11/1957 | Reff | 70/202 |
| 3,550,409 | 12/1970 | Pariser | 70/203 |
| 3,719,063 | 3/1973 | Fouces et al. | 70/202 |
| 3,958,308 | 5/1976 | Gooding | 411/554 |
| 4,142,809 | 3/1979 | Shell | 403/353 X |
| 4,755,092 | 7/1988 | Yaniv | 411/918 X |
| 5,267,458 | 12/1993 | Heh | 70/238 |
| 5,282,373 | 2/1994 | Riccitelli | 70/202 X |
| 5,537,846 | 7/1996 | Simon | 70/202 |

FOREIGN PATENT DOCUMENTS

| | | | |
|---|---|---|---|
| 0404709 | 12/1990 | European Pat. Off. | |
| 2419846 | 11/1979 | France | 70/202 |
| 2681823 | 4/1993 | France | 70/202 |
| 850440 | 8/1981 | U.S.S.R. | 70/238 |

*Primary Examiner*—Lloyd A. Gall
*Attorney, Agent, or Firm*—G. F. Gallinga

[57] ABSTRACT

A vehicle highly visible, convenient locking apparatus which locks all four wheels of a vehicle to prevent it from being driven or towed is disclosed. The apparatus which holds a brake pedal having a leg, close to a floor of a vehicle comprises: a mountable base having a lower side portion and an opposite side portion; and, a longitudinal member having a bottom end portion adapted to releasably engage in the opposite side portion of the base; a peddle holding/lock member carried by the longitudinal member. In use the base is mounted on the floor of the vehicle, beneath the brake pedal; the longitudinal member is releasably engaged in the base; the peddle is depressed, engaging the brakes; and the peddle holding/lock member is locked on the longitudinal member thereby holding the brake pedal in an engaged position and generally preventing the longitudinal member from turning.

14 Claims, 1 Drawing Sheet

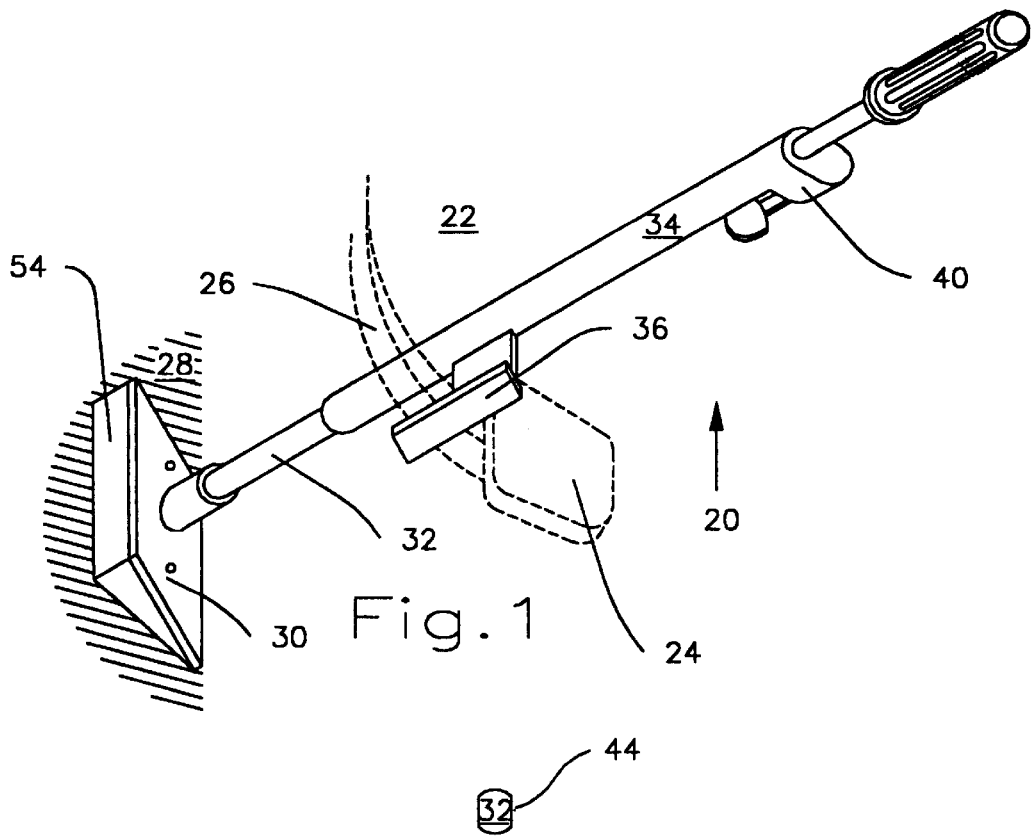
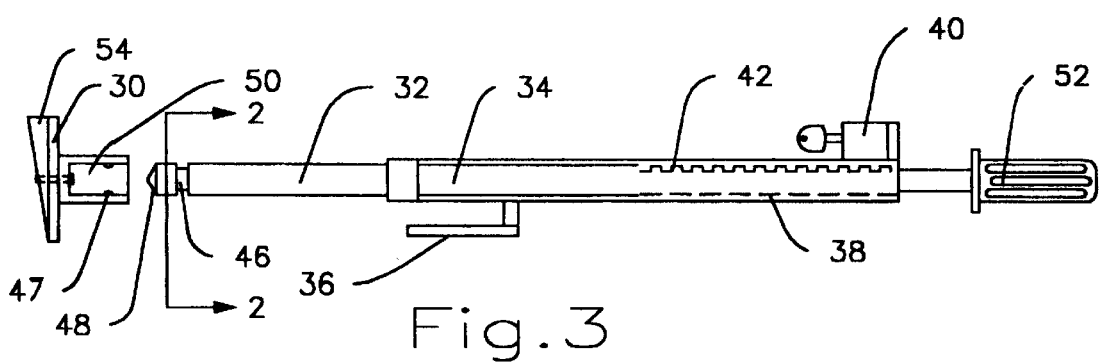

VEHICLE BRAKE LOCKING APPARATUS

FIELD OF INVENTION

This invention relates to vehicle theft protection devices. More particularly this invention relates to such devices which not only prevent the vehicle from being driven, but additionally prevent the vehicle from being towed by locking on the brakes of the vehicle.

BACKGROUND OF THE INVENTION

Vehicle theft exceeds all other classes of theft in our society. Vehicles have high value and are highly portable; they are highly vulnerable to theft. Consequently many different theft protection devices have been devised for their protection.

One of the most popular and effective types of theft protection devices are devices which lock on the steering wheel, to prevent it from being turned. One of these devices simply comprise a bar which locks on the steering wheel to prevent it from being turned. Another hooks a lower portion of the steering wheel to the brake pedal, thereby preventing the steering wheel from being turned. Since vehicle manufacturers have provided built in locks which automatically lock the steering wheel when the ignition key is removed, these steering wheel locks have become less popular. One problem with these devices is that they still allow the vehicle to be towed.

OBJECTS AND STATEMENT OF INVENTION

It is an object of this invention to disclose a vehicle locking apparatus which locks all four wheels of a vehicle to prevent it from being either driven or towed. It is an object of this invention to disclose an apparatus which is a highly visible deterrent to thieves. It is yet a further object of this invention to disclose an apparatus which is quickly and easily installed, and which, because of its small size, may be conveniently stored under a seat.

One aspect of this invention provides for a brake locking apparatus to hold a brake pedal having a leg, close to a floor of a vehicle comprising: a mountable base having a lower side portion and a shaft side portion; a longitudinal member having a bottom end portion adapted to releasably engage in the opposite side portion of the base; a peddle holding/lock member carried by the longitudinal member; wherein in use the base is mounted on the floor of the vehicle, beneath the brake pedal; the longitudinal member is releasably engaged in the base; the peddle is depressed, engaging the brakes; and the peddle holding/lock member is locked on the longitudinal member thereby holding the brake pedal in an engaged position and generally preventing the longitudinal member from turning.

Another aspect of this invention provides for an apparatus as above wherein the longitudinal member is adapted to engage after being turned in the base and wherein the brake pedal holding/lock member comprises a sleeve which slides over and in a track on the longitudinal member.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein:

FIG. 1 is a perspective view of a vehicle brake locking apparatus installed in a vehicle.

FIG. 2 is a cross sectional view of the vehicle brake locking apparatus, taken along line 2—2 in FIG. 3.

FIG. 3 is a cross sectional view of the bottom end portion of the shaft.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a vehicle brake locking apparatus 20 installed in a vehicle 22. The brake locking apparatus 20 holds a leg 26 of a brake pedal 24 close to a floor 28 of a vehicle 22. The apparatus 20 comprises a mountable base 30 having a lower side portion and a shaft side portion; a longitudinal member which preferably is a shaft 32 having a bottom end portion adapted to releasably engage in the opposite side portion of the base 30; and a peddle holding/lock member 34 carried by the shaft 32. In the preferred embodiment the pedal holding/lock member 34 is a sleeve which slides over the shaft 32. FIG. 1 best shows how the pedal holding/lock member 34 is adapted with a forwardly extending spaced arm 36 which engages over the leg 26 of the brake pedal 24.

FIG. 2 is a cross sectional view of the vehicle brake locking apparatus 20, taken along line 2—2 in FIG. 3. In the most preferred embodiment the shaft 32 has a flat side portion 38 along its top end portion so that the brake pedal holding/lock member 34 may be adapted to slidingly track therealong without rotating with respect to the shaft 32. In the preferred embodiment the flat side portion extends generally 8". A keyed lock 40 is provided on the pedal holding/lock member 34 so that it may be locked on the longitudinal member by means of a notch 42. Spaced notches 42 extend generally 6" along the shaft 32 on a side of the shaft 32 adjacent to the lock 40. A plastic grip 52 is positioned over a top portion of the shaft 32.

The bottom end portion of the shaft 32 is adapted to engage in the base 30 upon being turned therein. In the preferred embodiment the bottom end portion of the shaft 32 is provided with two opposite flat sides 44 (best shown in FIG. 3, a cross sectional view of the bottom end portion of the shaft) and a peripheral groove 46 therearound. The shaft side portion of the base 30 is provided with a matingly sized opening 50 having an inwardly projecting member which preferably is pin 47 so that the shaft 32 may be closely received in the opening 50 when the pin 47 is adjacent to a flat side 44. When the shaft 32 is fully inserted in the base 30 and turned one quarter of a revolution the pin 47 is then positioned in the groove 46 therein, thereby engaging the shaft 32 in the base 30. The bottom end portion of the shaft 32 is provided with a chamfer 48 therearound to assist in guiding the shaft 32 into the opening 50 in the base 30.

To use the vehicle brake locking apparatus 20 the base 30 is first mounted on the floor 28 of the vehicle 22, beneath the brake pedal 24. In some cases it may be necessary to use a wedge 54, sized to fit between the base 30 and the floor, to tilt the base 30 on an optimum angle so that the shaft 32 better extends towards the brake pedal 24 when engaged therein the base 30. The shaft 32 is then inserted fully into and rotated one quarter revolution within the base 30 so that it is engaged therein; the pedal 24 is depressed, engaging the brakes (not shown); and the peddle holding/lock member 34 is locked on the shaft 32 thereby holding the brake pedal 24 in an engaged position and generally preventing the shaft 32 from turning so that the shaft 32 cannot be removed from the base 30. The preferred embodiment of the invention has an overall length of 24" so that it is easily handled and may be conveniently stored during driving under the vehicle's seat (not shown).

The vehicle brake locking apparatus 20 is most difficult to remove by force. In the limited space around the brake pedal 24, it is difficult to swing and hammer it. Because it can move significantly while locked in position, it is also difficult to cut with a saw (not shown).

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A brake locking apparatus to hold a brake pedal having a leg, in an engaged position, close to a floor of a vehicle comprising:

a mountable base having a lower side portion and a shaft side portion;

a longitudinal member having a bottom end portion adapted to releasably and securely engage when a) inserted into the shaft side portion of the base, b) turned in one direction less than one half revolution therein, and then, c) held turned; whereby the longitudinal member, might be quickly, largely, and sufficiently removed from the securely held position by turning less than one half a revolution in the other direction; at least one of said base and longitudinal member being free of a screw thread; and, a peddle holding lock member carried by the longitudinal member;

wherein in use the base is mounted on the floor of the vehicle, beneath the brake pedal; the longitudinal member is releasably engaged in the base; the brake peddle is depressed; and the peddle holding lock member is locked on the longitudinal member thereby holding the brake pedal in an engaged position braking the vehicle, and generally preventing the longitudinal member from turning.

2. An apparatus as in claim 1 wherein the bottom end portion of the longitudinal member is adapted to engage in the base upon being turned one quarter of a revolution therein.

3. An apparatus as in claim 2 wherein the pedal holding lock member is adapted to engage over the leg of the brake pedal.

4. An apparatus as in claim 3 wherein the longitudinal member comprises a shaft having a track on which the pedal holding lock member slides.

5. An apparatus as in claim 4 wherein the track extends linearly along a portion of the length of the longitudinal member so that the pedal holding lock member slides along the longitudinal member.

6. An apparatus as in claim 4 wherein the track comprises a flat side portion on the shaft and wherein the brake pedal holding lock member is adapted to slidingly track therealong without rotating with respect to the shaft, and when the pedal holding lock member is engaged over the leg of the brake pedal, the longitudinal member is generally prevented from turning.

7. An apparatus as in claim 4 wherein the pedal holding lock member comprises a sleeve sliding over the longitudinal member.

8. An apparatus as in claim 7 wherein the pedal holding lock member may be locked on the longitudinal member by means of a keyed lock.

9. An apparatus as in claim 8 wherein the longitudinal member is provided with spaced notches therealong so that the pedal holding lock member may be locked in multiple positions therealong.

10. An apparatus as in claim 4 wherein the pedal holding lock member has a forwardly extending spaced arm, said arm being adapted to engage over the leg of the brake pedal.

11. An apparatus as in claim 10 wherein the bottom end portion of the shaft is provided with two opposite flat sides and a peripheral groove therearound; and, the shaft side portion of the base is provided with a matingly sized opening having an inwardly projecting member so that the shaft may be closely received in the opening with the member adjacent to a flat side, and when the shaft is fully inserted and turned one quarter of a revolution the member is positioned in the groove on the shaft, thereby locking the shaft in the base.

12. An apparatus as in claim 11 wherein the bottom end portion of the shaft is provided with a chamfer therearound to assist in guiding the shaft into the opening in the base.

13. An apparatus as in claim 12 further comprising a plastic grip positioned over a top portion of the shaft.

14. An apparatus as in claim 13 further comprising a wedge sized to fit between the base and the floor, to tilt the base on an optimum angle so that the shaft better extends towards the brake pedal when engaged in the base.

* * * * *